United States Patent
Lambert et al.

(10) Patent No.: US 9,545,739 B2
(45) Date of Patent: Jan. 17, 2017

(54) METHOD FOR PRODUCING A COMPOSITE BODY COMPRISING A PARTICLE FOAM MOLDED PART CONNECTED TO A HOLLOW BODY IN A FORCE-CLOSED MANNER

(71) Applicant: BASF SE, Ludwigshafen (DE)

(72) Inventors: Jürgen Lambert, Gommersheim (DE); Jürgen Bartl, Ludwigshafen (DE); Tim Albert, Bornheim (DE); Christian Obermann, Speyer (DE); Markus Buscher, Niederkirchen (DE)

(73) Assignee: BASF SE, Ludwigshafen (DE)

( * ) Notice: Subject to any disclaimer, the term of this patent is extended or adjusted under 35 U.S.C. 154(b) by 260 days.

(21) Appl. No.: 14/398,134

(22) PCT Filed: Apr. 25, 2013

(86) PCT No.: PCT/EP2013/058641
§ 371 (c)(1),
(2) Date: Oct. 31, 2014

(87) PCT Pub. No.: WO2013/164252
PCT Pub. Date: Nov. 7, 2013

(65) Prior Publication Data
US 2015/0107753 A1    Apr. 23, 2015

(30) Foreign Application Priority Data
May 2, 2012    (EP) .................................... 12166375

(51) Int. Cl.
| | | |
|---|---|---|
| *B32B 37/12* | (2006.01) | |
| *B29C 44/12* | (2006.01) | |
| *B29C 44/18* | (2006.01) | |
| *B29C 44/56* | (2006.01) | |
| *B29C 65/48* | (2006.01) | |
| *B29C 44/34* | (2006.01) | |
| *B29C 44/44* | (2006.01) | |
| *B32B 38/00* | (2006.01) | |
| *B29K 23/00* | (2006.01) | |
| *B29L 31/44* | (2006.01) | |
| *B29K 105/04* | (2006.01) | |
| *B29L 31/30* | (2006.01) | |
| *B29L 9/00* | (2006.01) | |

(52) U.S. Cl.
CPC ........... *B29C 44/3415* (2013.01); *B29C 44/12* (2013.01); *B29C 44/18* (2013.01); *B29C 44/3461* (2013.01); *B29C 44/3492* (2013.01); *B29C 44/445* (2013.01); *B29C 44/569* (2013.01); *B29C 44/5681* (2013.01); *B29C 65/48* (2013.01); *B32B 37/12* (2013.01); *B29K 2023/10* (2013.01); *B29K 2023/12* (2013.01); *B29K 2023/14* (2013.01); *B29K 2105/048* (2013.01); *B29K 2995/0002* (2013.01); *B29K 2995/0015* (2013.01); *B29K 2995/0091* (2013.01); *B29L 2009/00* (2013.01); *B29L 2031/3005* (2013.01); *B29L 2031/44* (2013.01); *B32B 2038/0088* (2013.01)

(58) Field of Classification Search
CPC .. B32B 37/12; B32B 2038/0088; B29C 44/02; B29C 44/12; B29C 44/14; B29C 44/16; B29C 44/18; B29C 44/181; B29C 44/3415; B29C 44/3426; B29C 44/3461; B29C 44/3492; B29C 44/3496; B29C 44/445; B29C 44/5681; B29C 44/569; B29C 65/48; B29K 2023/10; B29K 2023/12; B29K 2023/14; B29K 2105/048; B29K 2995/0091; B29L 2031/44
See application file for complete search history.

(56) References Cited

U.S. PATENT DOCUMENTS

| | | | | |
|---|---|---|---|---|
| 2,860,378 | A | * 11/1958 | Urchick | ..................... C08J 9/36 264/267 |
| 5,100,597 | A | 3/1992 | Erlenbach | |
| 7,070,730 | B2 * | 7/2006 | Hansen | .................. B29C 44/14 264/321 |
| 7,680,439 | B2 * | 3/2010 | Elbert | ................ G03G 15/0208 399/176 |
| 2002/0134502 | A1 | 9/2002 | Kolhammer et al. | |
| 2005/0218672 | A1 | 10/2005 | Mustafa et al. | |

FOREIGN PATENT DOCUMENTS

| | | | |
|---|---|---|---|
| DE | 4024274 | A1 | 2/1992 |
| DE | 19908486 | A1 | 8/2000 |
| DE | 10240606 | A1 | 2/2004 |
| DE | 102004013370 | A1 | 10/2005 |
| DE | 102006060130 | A1 * | 6/2008 |
| DE | 102010008268 | A1 | 8/2011 |
| EP | 0379857 | A1 | 8/1990 |
| EP | 1813409 | A2 | 8/2007 |
| JP | 55-19531 | A * | 2/1980 |

OTHER PUBLICATIONS

International Search Report for PCT/EP2013/058641 mailed Jun. 6, 2013.

* cited by examiner

*Primary Examiner* — Michael Tolin
(74) *Attorney, Agent, or Firm* — Drinker Biddle & Reath LLP

(57) ABSTRACT

The invention relates to a process for producing a composite structure comprising a main structure and an external shell connected to the main structure, where the main structure comprises a molded foam obtainable from prefoamed foam particles and the external shell comprises a hollow structure open at one end or at two opposite ends, and where a frictional connection is formed between the molded foam and the hollow structure.

8 Claims, No Drawings

METHOD FOR PRODUCING A COMPOSITE BODY COMPRISING A PARTICLE FOAM MOLDED PART CONNECTED TO A HOLLOW BODY IN A FORCE-CLOSED MANNER

CROSS-REFERENCE TO RELATED APPLICATIONS

This application is a national stage application (under 35 U.S.C. §371) of PCT/EP2013/058641, filed Apr. 25, 2013, which claims benefit of European Application No. 12166375.1, filed May 2, 2012, both of which are incorporated herein by reference in their entirety.

The invention relates to a process for producing a composite structure comprising a main structure and an external shell connected to the main structure, where the main structure comprises a molded foam obtainable from prefoamed foam particles and the external shell comprises a hollow structure open at one end or at two opposite ends.

Molded foams are used in many different ways and for a very wide variety of applications, because they are resilient and have low weight.

By way of example, therefore, expanded polypropylene foam beads are used to produce molded foams which are used mainly as packaging material for impact-sensitive goods, or in vehicle construction, as lightweight construction material for weight-reduction purposes. The excellent energy-absorption properties of said material and its high resilience improve vehicle safety and contribute to vehicle-weight reduction. Molded foams made of expanded polypropylene foam beads are moreover environmentally friendly and can generally be reused or recycled without difficulty.

The molded foams are often further processed with other materials to give composite structures, generally in order to combine the advantageous properties mentioned for the foam with particular properties of the other material.

Correspondingly, there are also known processes for producing composite components comprising an external shell and a main structure made of a molded foam and connected to the external shell.

By way of example, therefore, DE 199 08 486 A1 describes processes for laminating textile sheets on expanding moldable foam or on foamed moldings. The textile sheets here are placed in a mold and then either expandable polymer particles are introduced and foamed by using superheated steam, and at the same time the foam becomes connected to the textile sheet, or a foamed molding is first produced and then the textile sheet is laminated onto the material at elevated pressure and temperature, for example in a mold.

DE 40 24 274 A1 discloses processes for producing a cushioned part for the fitting-out of a vehicle, where a prefabricated substrate part and a surface foil are respectively inserted into one mold half of a mold and then a foamable polypropylene is introduced between said two layers. A cushioning layer securely connected to the two layers is then formed via foaming of the polypropylene with exposure to heat and pressure.

The processes described in the two specifications are in principle restricted to the production of sheet-like components. Said processes cannot process hollow structures to give a composite with a molded foam.

DE 10 2004 013 370 B4 discloses an energy-absorbing component where a blow-molded hollow structure made of thermoplastic encloses all sides of a foam filling. Moldable foams, in particular in the form of minibeads (i.e. prefoamed foam particles), are mentioned as preferred foam filling. A production process described is the introduction of said minibeads during the production of the hollow structure in the form of blow molding, where the minibeads can either be merely compressed or else, with exposure to by way of example superheated steam, can be fused to one another and also optionally to the internal wall of the hollow structure. However, because the component is cooled after it has been produced in this process, and because there is attendant shrinkage of the minibeads or of the moldable foam, it is impossible to avoid at least some separation of the foam filling from the internal wall of the hollow structure, and/or undesired formation of cavities within the minibeads or the moldable foam, and/or undesired component warpage.

The present invention was therefore based on the object of providing processes for producing a composite structure comprising a hollow structure comprising molded foam where no undesired separation of the molded foam from the hollow structure wall, and no undesired formation of cavities in the molded foam, occurs, in such a way that, by virtue of the impact-energy-absorbing and resilient properties of the molded foam, the hollow structure is filled or stiffened over the entire desired region, in particular completely, and exhibits no undesired warpage.

Accordingly, processes have been found for producing a composite structure comprising a main structure and an external shell connected to the main structure, where the main structure comprises a molded foam obtainable from prefoamed foam particles and the external shell comprises a hollow structure open at one end or at two opposite ends, and where it is essential to the invention that in a step a) fusing prefoamed foam particles in a mold by introducing a hot fluid with a temperature of from 105° C. to 180° C. to give a molded foam, and then demolding the molded foam at a mold temperature of from 40° C. to 100° C., in a subsequent step b) cooling, to a temperature of from 5° C. to 39° C., the molded foam removed from the mold, in a subsequent step c) introducing the cooled molded foam through an open end of a hollow structure into said hollow structure, and in a subsequent step d) heat-aging the hollow structure with the molded foam located therein over a period of from 0.5 h to 24 h at a temperature of from 40° C. to 100° C., where a frictional connection is formed between the hollow structure and the molded foam.

The processes of the invention permit the production of a composite structure comprising a hollow structure filled with molded foam where no undesired separation of the molded foam from the hollow structure wall, and no undesired formation of cavities in the molded foam, occurs, in such a way that, by virtue of the impact-energy-absorbing and resilient properties of the molded foam, the hollow structure is filled or stiffened over the entire desired region, in particular completely, and exhibits no undesired warpage.

The processes of the invention are described below.

The processes of the invention can produce composite structures which comprise a main structure and an external shell connected to the main structure, where the main structure comprises a molded foam obtainable from prefoamed foam particles and the external shell comprises a hollow structure open at one end or at two opposite ends.

Prefoamed foam particles, known as "beads" or "minibeads", are in principle known to the person skilled in the art and described in the literature. The average diameter of preferred prefoamed foam particles is usually preferably in the range from 0.5 mm to 20 mm, preferably from 0.8 mm to 15 mm, particularly preferably from 1 mm to 10 mm. The prefoamed foam particles can in principle be produced from any polymer which is suitable for forming prefoamed foam particles. The prefoamed foam particles are preferably based on expanded polypropylene (EPP), expanded polyethylene (EPE), expanded polystyrene (EPS), or expanded thermoplastic polyurethane (ETPU). The polymers mentioned here can be used in the form of homopolymers or else in the form of copolymers having up to 50% by weight, preferably up to 15% by weight, particularly preferably up to 10% by weight, based in each case on the total weight of the respective polymer, of one or more comonomers; particularly suitable copolymers are propylene-ethylene copolymers and styrene-ethylene copolymers. Particularly preferred polymers of which the prefoamed foam particles are composed are propylenehomo- or copolymers. Propylenehomo- or copolymers of this type are described in detail by way of example in EP-A 1 813 409. The bulk density of the prefoamed foam particles is usually in the range from 10 kg/m$^3$ to 150 kg/m$^3$, preferably in the range from 15 kg/m$^3$ to 120 kg/m$^3$, particularly preferably in the range from 17 kg/m$^3$ to 100 kg/m$^3$, and depends on the nature of the polymer and on the nature of the prefoaming process.

In a first step a) of the processes of the invention, the molded foam comprised by the main structure is produced in the shape desired for the respective subsequent application, examples being squares, sheets, rods, and also complex geometries, where the length, width, and height of said molded foams is generally, respectively mutually independently, in the range from 0.1 cm to 300 cm, preferably from 0.3 cm to 200 cm, particularly preferably from 0.5 cm to 100 cm. The precise dimensions of the molded foam and the dimensions of the hollow structure are to be adjusted appropriately to one another—as described at a later stage below. This first step a) per se, and the apparatuses suitable for implementation, for example automatic molding machines, are known to the person skilled in the art and described in the literature, for example in EP-A 1 813 409, which is expressly incorporated at this point; the corresponding apparatuses are available commercially. Prefoamed foam particles are introduced, preferably pneumatically, into a mold, in particular into a perforated aluminum, steel, sinter, or synthetic polymer mold, preferably pneumatically compressed, and then fused in said mold to give a molded foam via introduction of a hot fluid, preferably superheated steam, where the temperature of the hot fluid is from 105° C. to 180° C., preferably from 110° C. to 170° C., particularly preferably from 115° C. to 160° C. After the actual fusion procedure, the resultant molded foam has to be cooled in the mold to an extent such that, as the external side of the molded foam hardens during cooling, said side can withstand the internal pressure within the molded foam. Cooling of the molded foam is generally sufficient when the mold temperature has decreased to from 40° C. to 100° C., preferably from 60° C. to 90° C., particularly preferably from 75° C. to 85° C. At the conclusion of step a), the molded foam is demolded when the abovementioned mold temperature is reached.

The molded foams can have, on their external side, functional elements, for example pimples, or depressions in the form of points or of grooves, examples being beads, concave features, cavities, or incisions, which by way of example can serve to establish desired resilient properties, better connection to the hollow structure, or a function desired for the respective application, for example in the form of water-drainage grooves for applications in the garden-furniture sector. (Functional elements of this type are not considered in the description at a later stage below of the external cross section of the molded foam, as indicated by the wording "in essence" used there.)

The molded foams can also comprise, as fastening elements or stiffening elements, elements made of metal or of synthetic polymer which have been inserted into the foamed structure or have been connected thereto, and which in particular have been attached transversely with respect to the main direction of expansion of the foam. The introduction of fastening or stiffening elements of this type in step a) is known to the person skilled in the art.

In the subsequent step b) the molded foam removed from the mold is cooled to a temperature of from 5° C. to 39° C., preferably from 10° C. to 35° C., particularly preferably from 15° C. to 30° C. (where said temperature is to be measured within the interior of the molded foam at the location with the largest minimum distance from the external side of the molded foam, since this is generally the slowest-cooling part of the molded foam). In the simplest case, this can be achieved by storage at room temperature. The time needed for said cooling can vary widely, since it depends inter alia on the thickness of the molded foam and on the ambient temperature, but it is generally in the range from 1 min to 24 h, preferably from 2 min to 16 h, particularly preferably in the range from 5 min to 12 h. During the cooling in step b) a pressure lower than ambient pressure is generated in the cells of the molded foam, for example because steam present in the interior of the molded foam condenses, and this causes shrinkage of the molded foam. Said shrinkage becomes more pronounced as the density of the molded foam decreases, and as the cooling rate and the absolute temperature drop in step b) increase. The shrinkage of the molded foam during cooling as in step b) is generally from 1 to 20% along each of the three spatial directions, in particular from 2 to 10%. The density of the cooled molded foam is generally from 10 kg/m$^3$ to 200 kg/m$^3$, preferably from 20 kg/m$^3$ to 180 kg/m$^3$, and particularly preferably from 25 kg/m$^3$ to 150 kg/m$^3$, depending on the nature of the underlying polymer and on the manner in which the foaming process is implemented.

In the subsequent step c) of the processes of the invention the cooled molded foam is introduced at least to some extent, preferably completely, through an open end of a hollow structure into said hollow structure. The molded foam here at least to some extent, preferably completely, fills the hollow structure. In order that this introduction is in principle possible, the following must have been spatially adapted to be appropriate to one another in a manner known to a person skilled in the art, for example on the key-in-lock principle: the exterior shape of the molded foam, the aperture, and the shape of the internal space of the hollow structure. Both the aperture and the shape of the internal space of the hollow structure must on the one hand be sufficiently large to permit introduction of the molded foam, but on the other hand must be larger than the molded foam only to the minimum possible extent, in order to permit formation of the best possible frictional connection in step d).

This is ensured in the invention whenever, given respectively identical spatial arrangement of the molded foam and of the hollow structure with respect to one another, the molded foam at demolding temperature on demolding as in step a) is too large to be introduced into the hollow structure, but after cooling in step b) and the shrinkage associated therewith is sufficiently small to be introduced into the hollow structure.

In one preferred embodiment of the process of the invention, the external cross section of the molded foam perpendicularly to the direction of introduction according to step c) and the internal cross section of the hollow structure perpendicularly to the direction of introduction according to step c) have in essence the same shape. It is therefore preferable that molded foams which have an external cross section that is in essence round are introduced into hollow structures likewise having an internal cross section that is in essence round, or that molded foams which have an external cross section that is in essence rectangular are introduced into hollow structures likewise having an internal cross section that is in essence rectangular. The respective cross sectional areas here can remain identical along the direction of introduction in step c) over the entire length of the molded foam and, respectively, of the hollow structure (e.g. in the case of molded foams and hollow structures that are cylindrical along the direction of introduction in step c)), or they can become smaller (e.g. in the case of molded foams and hollow structures which narrow conically in the direction of introduction in step c)). The internal cross sectional area of the respective hollow structure perpendicularly with respect to the direction of introduction in step c) has to be selected to be greater than the external cross sectional area of the respective molded foam perpendicularly to the direction of introduction in step c), since otherwise no introduction is possible, but it must preferably be larger by the smallest possible amount, in order that a frictional connection of maximum effectiveness is formed in step d).

Particularly preferred processes of the invention, in particular for molded foams and hollow structures with, perpendicularly with respect to the direction of introduction in step c), identical shape of the external cross section and, respectively, of the internal cross section, are those where the area of the external cross section of the fused molded foam perpendicularly to the direction of introduction according to step c) is greater during demolding according to step a) and smaller after cooling according to step b) than the area of the internal cross section of the hollow structure perpendicularly to the direction of introduction according to step c). This embodiment permits both introduction of the molded foam into the hollow structure in step c) and also the formation of a frictional connection through the heat-aging in step d) in a particularly advantageous manner.

As described, the aperture and the shape of the internal space of the hollow structure are to be adjusted to be appropriate to the exterior shape of the molded foam. In view of this precondition, preferably suitable hollow structures are hollow profiles open at one or both ends, with round, oval, triangular, rectangular, or square cross sectional shape.

Preferred hollow structures which are hollow profiles open at both ends are pipes, in particular pipes composed of metal, synthetic polymer, or glass. The cross sectional shape of preferred pipes is round, oval, triangular, rectangular, or square. Other preferred hollow structures which are hollow profiles open at both ends are flexible tubes, in particular flexible tubes comprising a woven material made of metal, made of synthetic polymer, made of natural fiber, or made of glass, or is a braided material made of metal, or is wickerwork made of synthetic polymer, of natural fiber, or of glass. Other preferred hollow structures which are hollow profiles open at both ends are flexible tubular synthetic-polymer foils. In contrast to pipes, flexible tubes and flexible tubular synthetic-polymer foils are not rigid but can have a cross sectional shape which is in essence a defined shape (for example in the case of thick-walled woven flexible tubes made of metal), which is then preferably round, oval, triangular, rectangular, or square, but they can also have a variable cross sectional shape (for example in the case of flexible tubular synthetic-polymer foils, where these in principle can be collapsed to give sheet-like structures with an internal cross sectional area that is as small as desired), whereupon however, in particular by virtue of the introduction and heat-aging of the molded foam in steps c) and d), a defined cross sectional shape can be adopted, in essence determined by the shape of the molded foam. The length of said pipes, flexible tubes, and flexible tubular synthetic-polymer foils is preferably in the range from 5 cm to 5 m, particularly preferably in the range from 20 cm to 3 m, in particular in the range from 50 cm to 1 m, and preferred internal diameters are in the range from 1 to 100 cm, particularly preferably in the range from 5 to 50 cm, in particular in the range from 10 to 30 cm; the wall thicknesses of the pipes and flexible tubes and the thicknesses of the tubular foils can be selected freely, depending on the desired application and material used, within the ranges known to the person skilled in the art.

Preferred hollow structures which are hollow profiles open at one end are the pipes, flexible tubes, and flexible tubular synthetic-polymer foils described above, but with the proviso that these have been sealed at one end.

Other preferred hollow structures are shell- or trough-shaped components, particularly preferably shells or troughs which are made of synthetic polymer and which in particular are obtainable by the injection-molding process.

Very particularly preferred hollow structures are flexible tubes which are open at both ends and are made of woven material made of natural fiber or of woven material made of synthetic fiber, in particular flexible tubes made of rattan or of woven material made of poly rattan, or of woven material made of synthetic-polymer rattan, i.e. woven materials which are similar to rattan and which are obtainable from polymer strands based on polyethylene and which are known per se to the person skilled in the art and described in the literature, and available commercially. These flexible tubes made of woven material made of natural fiber or of woven material made of synthetic fiber can be obtained by way of example by adhesive-bonding, fusing, or sewing one side of a web made of the appropriate woven materials to the opposite side of the same web.

The external side of the hollow structures and/or of the external shells comprising same can have been designed as decorative or functional layer, as required by a desired application. By way of example, therefore, it is possible to use as external shells of the composite structures of the invention, hollow structures made of flexible tubes of woven material made of synthetic polymer, and in particular woven materials fused to give flexible tubes and made of poly rattan or of synthetic-polymer rattan, where the exterior appearance of these provides a very good imitation of natural rattan wickerwork, and accordingly they have very good suitability as furniture or as furniture components. The internal side of the hollow structures can have been provided with fixing elements in order to improve fixing of the molded foams, examples being pimple-shaped elevations. (Fixing elements of this type inter alia are ignored for the purposes of the shape described in the introduction for the internal cross section of the hollow structure, and this is expressed by the wording "in essence" used there.)

In the subsequent step d) of the process of the invention, the hollow structure with the molded foam located therein is heat-aged for a period of from 0.5 h to 24 h, preferably from 0.75 h to 18 h, particularly preferably from 1 h to 12 h, at a temperature of from 40° C. to 100° C., preferably from 60° C. to 90° C., particularly preferably from 75° C. to 85° C., for example in a commercially available drying-tunnel oven or other oven. During said heat-aging, diffusion of air into the material causes pressure equalization in the cell structure of the molded foam and the cell walls that collapsed to some extent during cooling in step b) recover. Said procedure causes expansion of the molded foam, in such a way that air located between the molded foam and the hollow structure is displaced and the molded foam presses firmly against the internal wall of the hollow structure, and consequently the molded foam fills and/or stiffens the hollow structure, in particular completely, over the entire desired region, and a frictional connection is formed between the hollow structure and the molded foam. Said condition is retained even when cooling of the composite structure takes place after step d), since the cell walls of the molded foam have stabilized during the heat-aging in step d) to an extent sufficient to inhibit any further shrinkage of the molded form.

For some applications it is desirable to bring about particularly strong linkage of the molded foam to the external shell. In these cases, the frictional connection formed in step d) can be supplemented by a coherent connection between the hollow structure and the molded foam. For this, prior to implementation of step c), the external side of the molded foam and/or the internal side of the hollow structure is/are provided at least to some extent with an adhesive which is suitable for the respective materials and is in principle known to the person skilled in the art.

Composite structures comprising a main structure and an external shell connected to the main structure are obtainable after the processes of the invention described above, where the main structure comprises a molded foam obtainable from prefoamed foam particles and the external shell comprises a hollow structure open at one end or at two opposite ends, and where there is a frictional connection between the hollow structure and the molded foam.

Preferred embodiments of the composite structures have been described above in the context of the description of the processes of the invention, and apply correspondingly to the preferred embodiments of the actual composite structures.

Particularly preferred composite components comprise, as main structure, a molded foam, in particular a molded foam in the shape of a cuboid, which has been produced from prefoamed propylenehomo- or copolymer particles and which has, over the entire area of a hollow structure functioning as external shell, a frictional connection to the hollow structure, where the hollow structure is formed from a flexible tube of woven material made of natural fiber or of woven material made of synthetic fiber, in particular a flexible tube made of woven material made of poly rattan or made of synthetic rattan.

The composite structures obtainable by the processes of the invention are suitable in particular as resilient, impact-energy-absorbing, sound-deadening, thermally insulating, and/or load-bearing constituents in apparatuses of any type, in particular in furniture, preferably in furniture exposed to weathering, for example garden chairs or garden benches, or in motor vehicles. The composite structures obtainable by the processes of the invention and comprising a flexible tube made of natural-fiber textile or of synthetic-fiber textile and functioning as external shell, in particular comprising a flexible tube made of poly rattan textile or of synthetic rattan textile, are particularly suitable as seat- or backrest elements for furniture, in particular for furniture exposed to weathering.

The processes of the invention permit production of a composite structure comprising a hollow structure filled with molded foam where no undesired separation of the molded foam from the hollow structure wall, and no undesired formation of cavities in the molded foam, occurs, in such a way that, by virtue of the impact-energy-absorbing and resilient properties of the molded foam, the hollow structure is filled or stiffened over the entire desired region, in particular completely, and exhibits no undesired warpage.

The examples below provide further explanation of the invention.

EXAMPLES

Inventive Example 1

Molded foams of cuboid shape were produced from expanded polypropylene foam particles with an average diameter of 3.5 mm and bulk density of 17.5 kg/m$^3$, marketed as Neopolen® by BASF SE, in a commercially available automatic molding machine with a cycle time of 3.0 min, by means of superheated steam with a temperature of 135° C., and these were demolded at a mold temperature of 75° C. The dimensions of the molded foams, still hot, on demolding were 113 cm×51.5 cm×15.45 cm; the density of the molded foams was 27.45 kg/m$^3$.

Over a period of 10 h, the foam moldings were then completely cooled to a temperature of 20° C., i.e. also in the interior. By virtue of the shrinkage that occurs during this process, the dimensions of the cooled molded foams were 102 cm×48 cm×13.5 cm, and the center of each side of the blocks here had sunk slightly in relation to the edges.

A rectangular piece of dimensions 246 cm×50 cm was cut out from a web of woven poly rattan, the two short opposite sides were mutually superposed with an overlap of 2 cm, and these were fused to form a hollow structure in the form of a flexible tube open at both ends.

One of the separately produced and cooled molded foams, with one of the two smallest sides facing forward, was then inserted completely into the flexible tube made of woven material made of synthetic-polymer rattan. (This is not possible with the molded foam that is still hot directly after demolding, since it is too large.)

Finally, the flexible tube made of woven material made of synthetic-polymer rattan, with the molded foam located therein, was heat-aged in an oven at a temperature of 80° C. for a period of 10 h, and then removed, and cooled to room temperature.

The resultant molded foam securely connected to the flexible tube made of woven material made of synthetic-polymer rattan as external shell measured 108 cm×50 cm×14 cm. The molded foam provided full stiffening to the resultant composite structure, without undesired warpage, and there was no observable separation at any point between the molded foam and the flexible tube made of woven material made of synthetic-polymer rattan, or any observable undesired cavitation in the molded foam.

The resultant composite structure is suitable as load-bearing seating area for garden furniture.

Comparative Example 1

A flexible tube produced exactly as described in inventive example 1 and made of woven material made of synthetic-polymer rattan was inserted into a mold with mold-cavity dimensions of 110 cm×50 cm×15 cm, and expanded polypropylene foam particles of the type described in inventive example 1 were charged to said flexible tube. The foaming procedure was then likewise carried out with superheated steam at a temperature of 135° C. over a period of 3.0 min, and finally the resultant composite structure was removed from the mold and cooled.

The composite molding obtained from this comparative example exhibited marked warpage, there was separation at a number of points between the molded foam and the flexible tube made of woven material made of synthetic-polymer rattan, and said flexible tube had not been stiffened completely.

The invention claimed is:

1. A process for producing a composite structure comprising a main structure and an external shell connected to the main structure, where the main structure comprises a molded foam obtainable from prefoamed foam particles and the external shell comprises a hollow structure open at one end or at two opposite ends, which comprises
    in a step a) fusing prefoamed foam particles in a mold by introducing a hot fluid with a temperature of from 105° C. to 180° C. to give a molded foam, and then demolding the molded foam at a mold temperature of from 40° C. to 100° C.,
    in a subsequent step b) cooling, to a temperature of from 5° C. to 39° C., the molded foam removed from the mold,
    in a subsequent step c) introducing the cooled molded foam through an open end of a hollow structure into said hollow structure, and
    in a subsequent step d) heat-aging the hollow structure with the molded foam located therein over a period of from 0.5 h to 24 h at a temperature of from 40° C. to 100° C., where a frictional connection is formed between the hollow structure and the molded foam.

2. The process according to claim 1, wherein on respective identical spatial arrangement of the molded foam and of the hollow structure with respect to one another the molded foam at demolding temperature on demolding as in step a) is too large to be introduced into the hollow structure, but after cooling as in step b) is sufficiently small to be introduced, as in step c), into the hollow structure.

3. The process according to claim 1, wherein the external cross-section of the molded foam perpendicular to the direction of introduction according to step c) and the internal cross-section of the hollow structure perpendicular to the direction of introduction according to step c) have in essence the same shape.

4. The process according to claim 1, wherein the area of the external cross-section of the fused molded foam perpendicular to the direction of introduction according to step c) is greater during demolding according to step a) and smaller after cooling according to step b) than the area of the internal cross-section of the hollow structure perpendicular to the direction of introduction according to step c).

5. The process according to claim 1, wherein the external side of the molded foam and/or the internal side of the hollow structure has/have been provided at least to some extent with an adhesive and in step d) a coherent connection is also formed between the hollow structure and the molded foam.

6. The process according to claim 1, wherein the hollow structure is a hollow profile open at one or both ends, with round, oval, triangular, rectangular, or square cross-sectional shape.

7. The process according to claim 1, wherein the hollow structure is a pipe composed of metal, synthetic polymer, or glass, or is a flexible tube comprising a woven material made of metal, made of synthetic polymer, made of natural fiber, or made of glass, or is a braided material made of metal, or is wickerwork made of synthetic polymer, of natural fiber, or of glass, or is a flexible tubular synthetic-polymer foil.

8. The process according to claim 1, wherein the molded foam in step a) is produced from prefoamed foam particles comprising a propylenehomo- or copolymer.

* * * * *